(No Model.) 3 Sheets—Sheet 2.

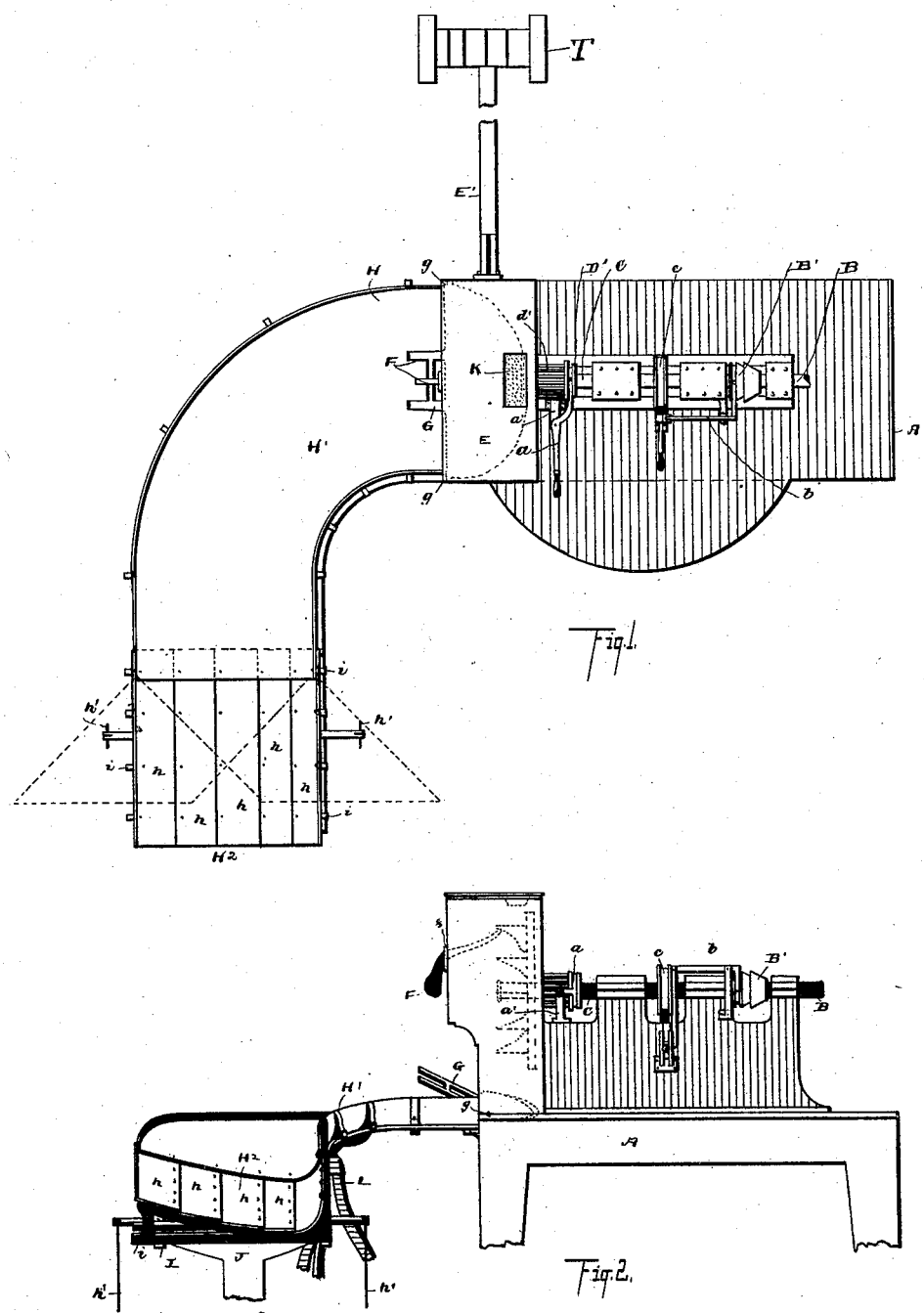

W. J. KARNEN.
REEL FOR WIRE RODS.

No. 370,792. Patented Oct. 4, 1887.

WITNESSES
N. S. Amstutz
Geo. W. King

Wm J Karnen INVENTOR
By
Leggett & Leggett Attorneys (No Model.) 3 Sheets—Sheet 3.

W. J. KARNEN.
REEL FOR WIRE RODS.

No. 370,792. Patented Oct. 4, 1887.

WITNESSES

Wm. J. Karnen INVENTOR

By Leggett & Leggett Attorneys

UNITED STATES PATENT OFFICE.

WILLIAM J. KARNEN, OF CLEVELAND, OHIO.

REEL FOR WIRE RODS.

SPECIFICATION forming part of Letters Patent No. 370,792, dated October 4, 1887.

Application filed February 2, 1887. Serial No. 226,237. (No model.)

*To all whom it may concern:*

Be it known that I, WILLIAM J. KARNEN, of Cleveland, in the county of Cuyahoga and State of Ohio, have invented certain new and useful Improvements in Reels for Wire Rods; and I do hereby declare the following to be a full, clear, and exact description of the invention, such as will enable others skilled in the art to which it pertains to make and use the same.

My invention relates to improvements in automatic reels for wire rods; and it consists in certain features of construction and in combination of parts, hereinafter described, and pointed out in the claims.

Figure 4:
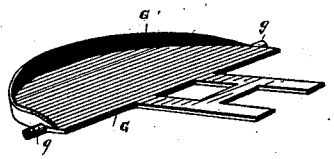
Figure 3:
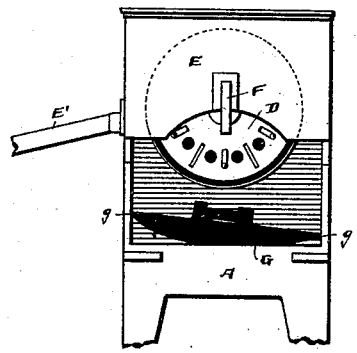
Figure 5:
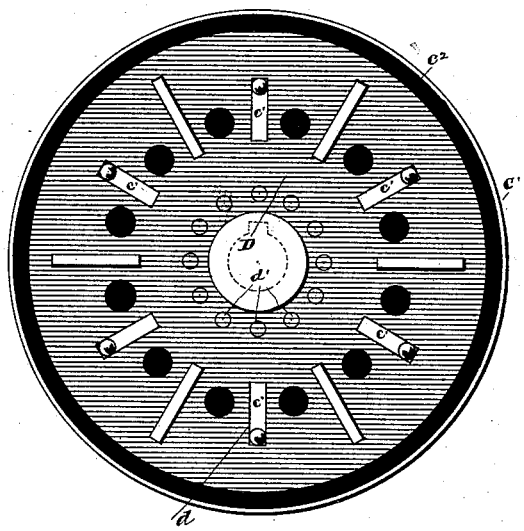
Figure 6:
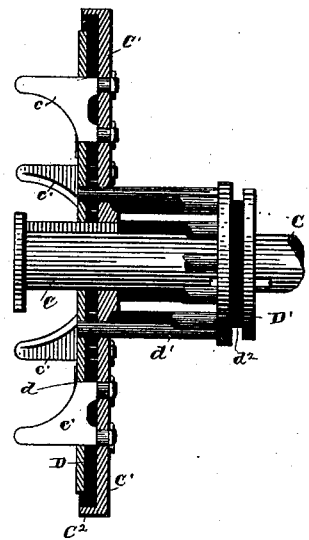
Figure 7:
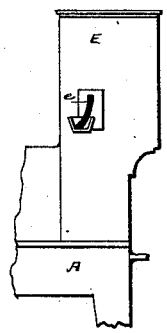
Figure 8:
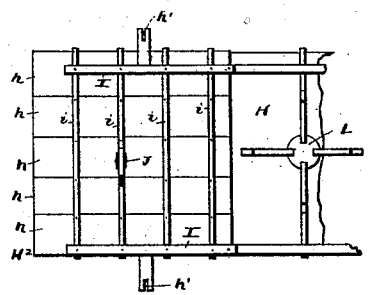

In the accompanying drawings, Figure 1 is a plan of a reel and attachments embodying my invention. Fig. 2 is a side elevation of the same. Fig. 3 is an end elevation, with the discharging-chute removed. Fig. 4 is a view in perspective of a gravity dumping device. Fig. 5 is an end elevation showing the reel-disk. Fig. 6 is a section through the center of the reel-disk, taken lengthwise of the supporting-shaft. Fig. 7 shows the reverse side of the housing. Fig. 8 is a bottom plan of the adjustable end of the chute.

A represents a supporting-frame, the same being provided with suitable boxes, in which are journaled the driving-shaft B and the reel-shaft C, these two shafts being set in line and connected by a friction-clutch, B'. The lever $b$, for operating the clutch by means of suitable connecting mechanism, also operates a brake-band on the brake-wheel $c$ of the reel-shaft, the arrangement of mechanism being such that the brake is tightened when the clutch is loosened, and vice versa. The clutch, brake, and mechanism for operating both from a single hand-lever being well known, it is not considered necessary to describe them in detail.

Upon the shaft C are mounted the disks C', D, and D', the former being keyed fast to the shaft, while the two latter are made to move freely endwise of the shaft. The disk C' has an overhanging rim, $C^2$, and has attached a series of laterally-projecting arms, $c'$, set in order concentric with the shaft C. The disk D has holes $d$, that fit loosely over the arms $c'$. This disk is connected by rods $d'$ with the disk D', the rods passing through suitable holes made in the disk C'. The disk D' has a groove, $d^2$, at the periphery thereof, that is engaged by the forked end of the lever $a$, the latter being pivoted to the bracket $a'$ of the supporting-frame. By means of this lever the disk D may be drawn against the face of the disk C', or may be moved outward to the extreme ends of the arms $c'$.

A suitable housing, E, is made to cover the reel. The wire rod from the train T is conducted by a trough or suitable device, E', and made to enter a slot, $e$, made in the housing and in position to guide the end of the rod-wire near to the face of the disk C'. The operator, by means of the lever $a$, separates the two disks to receive the end of the rod between them, and immediately reverses the lever to clamp the rod between the disks, by means of which, the disks being in motion, the rod is drawn in and wound upon the reel, and by means of the overhanging rim $C^2$ the rod is wound on the arms $c,'$ outside the disk D. When the rod is all wound upon the reel the disk D is forced outward to push the coil of rod off from the reel. As this is done, the first part of the coil that is forced off from the reel would be likely to fall before the remainder of the coil left the reel, and thus tangle the wire rod, to prevent which I have provided the lever F to receive the coil as it is forced from the reel. This lever is pivoted at $f$ to the housing, and the inner end thereof slopes inward and upward toward the upper sweep of the arms $c'$, substantially as shown in dotted lines, Fig. 2. The outer end of this lever is weighted and forms a counterbalance to partially support the weight of the rod-coil. When the coil is entirely forced from the reel, so that its weight comes wholly upon the lever, the inner end thereof tilts downward and the bottom of the coil strikes upon the apron G. This apron is pivoted at $g$, and has an upwardly-projecting curved rim, G', that is intended approximately to fit the periphery of the coil. This side of the apron having the rim is the heaviest, and causes the apron to stand in the inclined position shown in Fig. 2. The coil of wire rod strikes the apron just inside of the pivotal line and slides along down the apron till it engages the rim. Meantime the lever F is tilted to a depending position and releases the coil just as the latter reaches the rim of the apron. The bottom of the coil having thus been deflected inward, the coil, when relieved by the lever F, falls outward, and the size and weight of the coil are such as to bring the center of gravity outside of the pivotal line of the apron. The apron and coil therefore tilt outward, and the latter is discharged on the chute H. This chute is given a quarter-turn, as shown at H', to discharge the rod-coil to the one side out of the way of any workman or operations that may be carried on in front of the rod-train. The chute is inclined, so that the coils slide down the chute by gravity. A lower section of the chute $H^2$ is jointed to the main portion of the chute, so that this section may be turned laterally a limited distance, by means of which the rod-coil may be discharged successively at different places and the first pile of coils allowed to cool somewhat, so that they can be handled and removed while the other piles are successively accumulating. In this manner the work is made continuous. The jointed section may be constructed in various ways—for instance, as shown in Figs. 1 and 8, to wit: Side bars, I, are pivoted to the main part of the chute, so that they may turn laterally. These side bars are pivotally connected with cross-bars $i$, and the plates $h$, on which the rod-coils slide, are respectively secured loosely by single rivets or bolts to the different cross-bars $i$.

A post, J, and a wheel, $j$, support the movable portion of the chute, while the leg L supports the lower end of the stationary part of the chute. The chute is usually provided with handles $h'$ for moving the lower end of the same. Suppose the chute is turned to the right and then allowed to remain while the rod-coils are being discharged in a pile as high as the elevation of the tail end of the chute will admit. The chute is then turned to the left hand far enough to form a new pile, and so on, the chute being again turned to the right hand after the first pile of rod-coil has been removed.

K is a tallow-box made on the housing, the latter having a suitable hole for discharging lubricant upon the reel. Suet or other suitable lubricant is kept in the box K, the heat from the rod-coil being sufficient to melt the suet fast enough to keep the reel well lubricated. The slot $e$ through the housing curves outward and upward, as shown in Fig. 7, to accommodate the rod that accumulates on the reel. The rod being wound first next the disk D, as the coil increases in size the rod has a tendency to move up in the slot $e$, and by means of the outward curve in the latter the rod is guided farther out on the arm $c'$.

With wire-rod reels heretofore in use the reel is stopped to remove the coil, and the end of the wire rod coming from the rod-train is passed by hand between the arms of the reel while the latter is not in motion. Owing to the delay in stopping the reel and removing the coil and entering the rod by hand two such reels are required to keep up with the rod-train and do the work that can easily be done by one of my improved reels.

What I claim is—

1. In a wire-rod reel, the combination, with a revolving disk and arms for winding the rod, said disk having a rim made to overhang the base of the arms, of a movable disk made to embrace the said arms loosely, and mechanism, substantially as shown, for moving the latter disk to clamp the end of the rod and to discharge the rod-coil from the reel, substantially as set forth.

2. The combination, with a reel, substantially as indicated, of a weighted tilting lever made to support the rod-coil while the latter is being discharged from the reel, substantially as set forth.

3. The combination, with the reel and tilting lever, substantially as indicated, of a tilting apron arranged to receive the rod-coil and discharge the latter outward by the gravity of the coil, substantially as set forth.

4. The combination, with a reel for coiling wire rod, of an inclined chute for piling the rods, said chute having a jointed lower end made to move laterally, substantially as set forth.

In testimony whereof I sign this specification, in the presence of two witnesses, this 4th day of December, 1886.

WILLIAM J. KARNEN.

Witnesses:
 CHAS H. DORER,
 G. ENGEL.